US010853691B1

United States Patent
Webb et al.

(10) Patent No.: US 10,853,691 B1
(45) Date of Patent: Dec. 1, 2020

(54) NEURAL NETWORK ARCHITECTURE

(71) Applicants: Russell Y. Webb, San Jose, CA (US);
Jason Ramapuram, Sunnyvale, CA (US)

(72) Inventors: Russell Y. Webb, San Jose, CA (US);
Jason Ramapuram, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 16/240,935

(22) Filed: Jan. 7, 2019

Related U.S. Application Data

(60) Provisional application No. 62/685,500, filed on Jun. 15, 2018, provisional application No. 62/621,845, filed on Jan. 25, 2018.

(51) Int. Cl.
*G06K 9/62* (2006.01)
*G06K 9/52* (2006.01)
*G06K 9/66* (2006.01)
*G06N 5/04* (2006.01)

(52) U.S. Cl.
CPC ............ *G06K 9/6232* (2013.01); *G06K 9/52* (2013.01); *G06K 9/66* (2013.01); *G06N 5/046* (2013.01)

(58) Field of Classification Search
CPC .......... G06K 9/6232; G06K 9/66; G06K 9/52; G06N 5/046
USPC ........................................................ 382/155
See application file for complete search history.

(56) References Cited

U.S. PATENT DOCUMENTS

| 9,542,621 | B2 | 1/2017 | He et al. |
| 9,858,496 | B2 | 1/2018 | Sun et al. |
| 10,445,881 | B2 * | 10/2019 | Spizhevoy ........... G06K 9/4652 |
| 2016/0358337 | A1 | 12/2016 | Dai et al. |
| 2017/0140248 | A1 | 5/2017 | Wang et al. |
| 2017/0249547 | A1 | 8/2017 | Shrikumar et al. |
| 2018/0046900 | A1 | 2/2018 | Daily et al. |
| 2018/0116380 | A1 | 5/2018 | Wehner |
| 2018/0116889 | A1 | 5/2018 | Tsukayama et al. |
| 2018/0293711 | A1 * | 10/2018 | Vogels .................... G06F 17/10 |
| 2019/0188537 | A1 * | 6/2019 | Dutta .................... G06K 9/6262 |

FOREIGN PATENT DOCUMENTS

| EP | 3451293 | * | 6/2019 | ............... G06T 9/00 |

OTHER PUBLICATIONS

Inception-v4, Inception-ResNet and the Impact of Residual Connections on Learning: Authors: Szegedy, Ioffe, Vanhoucke and Alemi; Google; Aug. 2016 (Year: 2016).*

(Continued)

*Primary Examiner* — Jerome Grant, II
(74) *Attorney, Agent, or Firm* — Young Basile Hanlon & MacFarlane, P.C.

(57) ABSTRACT

A method includes processing an input image using convolution layers to define image features and processing the image features to define feature statistics. Processing the image features includes applying an activation function in a feature dimension of the image features. The method also includes processing the feature statistics using fully connected layers to produce a binary output regarding a characteristic of the input image.

20 Claims, 7 Drawing Sheets

(56) References Cited

OTHER PUBLICATIONS

Making a Science of Model Search: Hyperparameter Optimization in Hundreds of Dimensions for Vision Architectures; Authors: Bergstra; Yamins; Cox; Proceedings of the 30th International Convference on Machne Learning JMLR: W&CP vol. 28—Jan. 2013 (Year: 2013).*

Clevert, Djork-Arne, et. al., "Fast and Accurate Deep Network Learning by Exponential Linear Units (ELUs)", Cornell University Library, Computer Science, Learning, https://arxiv.org/abs/1511.07289, Feb. 22, 2016 (14 pp).

Das, Rajarshi, et. al., "Chains of Reasoning Over Entities, Relations, and Text Using Recurrent Neural Networks", Cornell University Library, Computer Science, Computation and Language, https://arxiv.org/abs/1607.01426, May 1, 2017 (10 pp).

Durand, T., et. al., "WELDON: Weakly Supervised Learning of Deep Convolutional Neural Networks", IEEE Xplore, Digital Library, 2016 IEEE Conference on Computer Vision and Pattern Recognition (CVPR), Jun. 27, 2016, https://ieeexplore.ieee.org/document/7780882/, (10 pp).

Glorot, X., et. al., "Understanding the Difficulty of Training Deep Feedforward Neural Networks", Proceedings of the Thirteenth International Conference on Artificial Intelligence and Statistics, PMLR vol. 9, pp. 249-256, 2010, http://proceedings.mlr.press/v9/glorot10a.html (8 pp).

github.com, "Arcade Dataset Generator", https://github.com/caglar/Arcade-Universe, (1 pp).

Gulcehre, C., et. al., "Knowledge Matters: Importance of Prior Information for Optimization", Journal of Machine Learning Research 17 (2016), pp. 1-32, (32 pp).

He, K., et al., "Deep Residual Learning for Image Recognition", 2016 IEEE Conference on Computer Vision and Pattern Recognition (CVPR), Jun. 27, 2016, https://ieeexplore.ieee.org/document/7780459/, (9 pp).

Hoffer, E., et. al., "Train longer, generalize better: closing the generalization gap in large batch training of neural networks", Cornell University Library, Statistics, Machine Learning, https://arxiv.org/abs/1705.08741, Jan. 1, 2018 (15 pp).

Ioffe, S., et. al., "Batch Normalization: Accelerating Deep Network Training by Reducing Internal Covariate Shift", Cornell University Library, Computer Science, Learning, https://arxiv.org/abs/1502.03167, Mar. 2, 2015 (11 pp).

Johnson, J., et. al., "CLEVR: A Diagnostic Dataset for Compositional Language and Elementary Visual Reasoning", Cornell University Library, Computer Science, Computer Vision and Pattern Recognition, https://arxiv.org/abs/1612.06890, Dec. 20, 2016 (17 pp).

Kingma, D., et. al., "Adam: A Method for Stochastic Optimization", Cornell University Library, Computer Science, Learning, https://arxiv.org/abs/1412.6980, Jan. 30, 2017 (15 pp).

Krizhevsky, A., et. al., "ImageNet Classification with Deep Convolutional Neural Networks", ACM Digital Library, NIPS 2012 Proceedings of the 25th International Conference on Neural Information Processing Systems, vol. 1, pp. 1097-1105, Dec. 3, 2012, https://dl.acm.org/citation.cfm?id=2999257 (9 pp).

Lecun, Y., et. al., "Gradient-Based Learning Applied to Document Recognition", IEEE Xplore, Proceedings of the IEEE (vol. 86, Issue 11, Nov. 1998), https://ieeexplore.ieee.org/document/726791/ (46 pp).

Maass, W., "On the Computational Power of Winner-Take-All", the MIT Press Journals, Neural Computation, vol. 12, Issue 11, Nov. 2000, pp. 2519-2535, https://www.mitpressjournals.org/doi/abs/10.1162/089976600300014827?journalCode=neco, (19 pp).

Noroozi, M., et. al., "Representation Learning by Learning to Count", Cornell University Library, Computer Science, Computer Vision and Pattern Recognition, https://arxiv.org/abs/1708.06734, Aug. 22, 2017 (10 pp).

Oquab, M., et. al., "Is Object Localization for Free?—Weakly-supervised learning with convolutional neural networks", IEEE Xplore, 2015 IEEE Conference on Computer Vision and Pattern Recognition (CVPR), Jun. 7, 2015, https://ieeexplore.ieee.org/document/7298668/ (10 pp).

Popper, Karl., "The Logic of Scientific Discovery", Part II, Some Structural Components of a Theory of Experience, Chapter 4: Falsifiability, pp. 57-74, Hutchinson & Co., 1959, Logik der Forschung first published 1935 by Verlag von Julius Springer, Vienna, Austria, (18 pp).

Santoro, A., et. al., "A simple neural network module for relational reasoning", Cornell University Library, Computer Science, Computation and Language, https://arxiv.org/abs/1706.01427, Jun. 5, 2017, (16 pp).

Silver, D, et. al. "Mastering the game of go without human knowledge", Nature, 550(7676):354, 2017, (19 pp).

Simonyan, K., et. al., "Very Deep Convolutional Networks for Large-Scale Image Recognition", Cornell University Library, Computer Science, Computer Vision and Pattern Recognition, https://arxiv.org/abs/1409.1556, Apr. 10, 2015, (14 pp).

Srivastava, N., et. al., "Dropout: A Simple Way to Prevent Neural Networks From Overfilling", Journal of Machine Learning Research 15 (2014), pp. 1929-1958 (30 pp).

Srivastava, R., et. al., "Compete to Compute", Part of Advances in Neural Information Processing Systems 26 (NIPS 2013), https://papers.nips.cc/paper/5059-compete-to-compute (9 pp).

Srivastava, R., et. al., "Training Very Deep Networks", Cornell University Library, Computer Science, Learning, https://arxiv.org/abs/1507.06228, Nov. 23, 2015, (9 pp).

Szegedy, C., et. al., "Rethinking the Inception Architecture for Computer Vision", Cornell University Library, Computer Science, Computer Vision and Pattern Recognition, https://airxiv.org/abs/1512.00567, Dec. 11, 2015 (10 pp).

Wan, L., et. al., "Regularization of Neural Networks Using DropConnect", Proceedings of the 30th International Conference on Machine Learning, 2013, JMLR: W&CP, vol. 28, (9 pp).

Weston, J., et. al., "Memory Networks", Cornell Univesity Library, Computer Science, Artifical Intelligence, https://arxiv.org/abs/1410.3916, Nov. 29, 2015 (15 pp).

Xu, K., et. al., "Show, Attend and Tell: Neural Image Caption Generation With Visual Attention", Cornell University Library, Computer Science, Learning, https://arxiv.org/abs/1502.03044, Apr. 19, 2016, (22 pp).

Zeiler M. D., "Adadelta: An Adaptive Learning Rate Method", Cornell University Library, Computer Science, Learning, https://arxiv.org/abs/1212.5701, Dec. 22, 2012, (6 pp).

Bansal, T., et. al., "RelNet: End-to-End Modeling of Entities & Relations", Cornell University Library, Computer Science, Computation and Language, https://arxiv.org/abs/1706.07179, Nov. 16, 2017 (7 pp).

\* cited by examiner

NEURAL NETWORK ARCHITECTURE

CROSS-REFERENCE TO RELATED APPLICATIONS

This application claims the benefit of U.S. Provisional Application No. 62/685,500, filed on Jun. 15, 2018. This application also claims the benefit of U.S. Provisional Application No. 62/621,845, filed on Jan. 25, 2018. The contents of the foregoing applications are incorporated herein by reference in their entireties for all purposes.

TECHNICAL FIELD

This disclosure relates to a neural network architecture for solving problems with little supervision.

BACKGROUND

Machine learning models, such as deep neural networks (DNNs), are trained to perform tasks based on examples. A set of examples provided to a machine learning algorithm may be referred to as training data or a training data set. Training data can include annotations, which may be referred to as ground truth information, that describes the content of each example in the training data. For example, a machine learning model can be trained to recognize the presence or absence of a feature in an image providing the machine learning model with a large number of example images and annotations that indicate, for each of the training images, whether or not the feature is present.

SUMMARY

One aspect of the disclosure is a method includes processing an input image using convolution layers to define image features and processing the image features to define feature statistics. Processing the image features includes applying an activation function in a feature dimension of the image features. The method also includes processing the feature statistics using fully connected layers to produce a binary output regarding a characteristic of the input image.

In some implementations, processing the image features further includes applying a 1×1 convolution prior to applying the activation function in the feature dimension. In addition, processing the images features may be performed by applying the 1×1 convolution and applying the activation function in the feature dimension two or more times in parallel branches. Values obtained from the parallel branches are combined by superposition.

In some implementations, processing the image features further includes applying pooling subsequent to applying the activation function in the feature dimension. Processing the image features may also include summing the image features in a first spatial dimension and a second spatial dimension subsequent to applying pooling, such that the feature statistics include a spatially-summed vector that represents the image features. Processing the images features may be performed by applying pooling and summing the image features two or more times in parallel branches, wherein pooling is applied using a different pooling size for each of the parallel branches. Values obtained from the parallel branches may be combined by concatenation.

In some implementations, the image features include values representing presence or absence of features in the input image with respect to each of a first spatial dimension, a second spatial dimension, and the feature dimension.

In some implementations, the activation function that is applied in the feature dimension is a softmax activation function. In some implementations, the activation function that is applied in the feature dimension is a scaled exponential linear unit activation function.

Another aspect of the disclosure is a neural network for processing an input image. The neural network includes convolution layers, a feature analyzer, and fully connected layers. The convolution layers accept the input image as an input and produce a feature matrix including values for image features representing presence or absence of the image features in the input image with respect to a first spatial dimension, a second spatial dimension, and a feature dimension. The feature analyzer accepts the feature matrix as an input, applies an activation function in the feature dimension, and produces a spatially-summed feature vector. The fully connected layers accept the spatially-summed feature vector as an input and produce a binary output regarding a characteristic of the input image.

Another aspect of the disclosure is a method for training a neural network. The method includes processing an input image using convolution layers to define image features and processing the image features using feature analysis layers to define feature statistics. Processing the image features includes applying a 1×1 convolution to the image features and applying an activation function in a feature dimension of the image features. The method also includes processing the feature statistics using fully connected layers to produce a binary output regarding a characteristic of the input image, and adjusting at least one of the convolution layers, the feature analysis layers, and the fully connected layers based on a comparison of the binary output to a weak supervision signal that corresponds to the input image.

In some implementations, processing the image features further includes applying pooling subsequent to applying the activation function in the feature dimension. In some implementations, processing the image features further includes summing the image features in a first spatial dimension and a second spatial dimension subsequent to applying pooling, such that the feature statistics include a spatially-summed vector that represents the image features.

DETAILED DESCRIPTION

Deep neural networks are powerful tools for functional approximation, and allow solutions to complex tasks to be learned, including for tasks that were not solvable by traditional machine learning methods. Some problems, however, have been regarded as difficult or impossible for a deep neural network to solve without the guidance of human insight. Examples of these problems include parity, counting, scene understanding, and visual query answer problems.

Previous solutions to problems such as these utilize supervised learning approaches that incorporate engineering knowledge into the model or training procedure. These methods, however, are constrained in that they rely on humans to properly define the problems and sub-problems addressed. Examples of sub-problems that may be present when interpreting the contents of an image include segmentation and object classification. While human insight is useful in many problems to identify the signals that are relevant to determining the solution to the problem, there is a possibility that all of the relevant signals will not be identified when developing a solution to a complex problem in reliance on human insight.

The neural network architecture described herein is applicable to learning under a weak supervision signal and utilizing neural networks to extract relational information from data. As used herein, the term "weak supervision" means that the model is required to solve a high-level task, such as a binary classification task, by only observing raw pixels of an input image. The model is not provided with sub-problem class labels or any other structured, supervised information and instead learns a high-level representation of the visual scene using binary labels relating to the whole image.

The neural network architecture that is described herein learns complex object relationships from a binary loss function that provides little information about the underlying task. Generally stated, the neural network architecture aggregates channel-wise statistics and solves the overall task by linearly combining these statistics. The neural network builds a set of problem-related, local statistics and linearly combine these to predict the end objective.

As will be explained further herein, the neural network architecture may be configured to build a histogram of learned features. The histogram that is learned by the neural network architecture allows for more efficient processing because it is a statistical model of the whole image or of an attended region of the image. The learned statistic is independent of input image size because it is summed over the width and height of the image or the attended region of the image.

Figure 1:
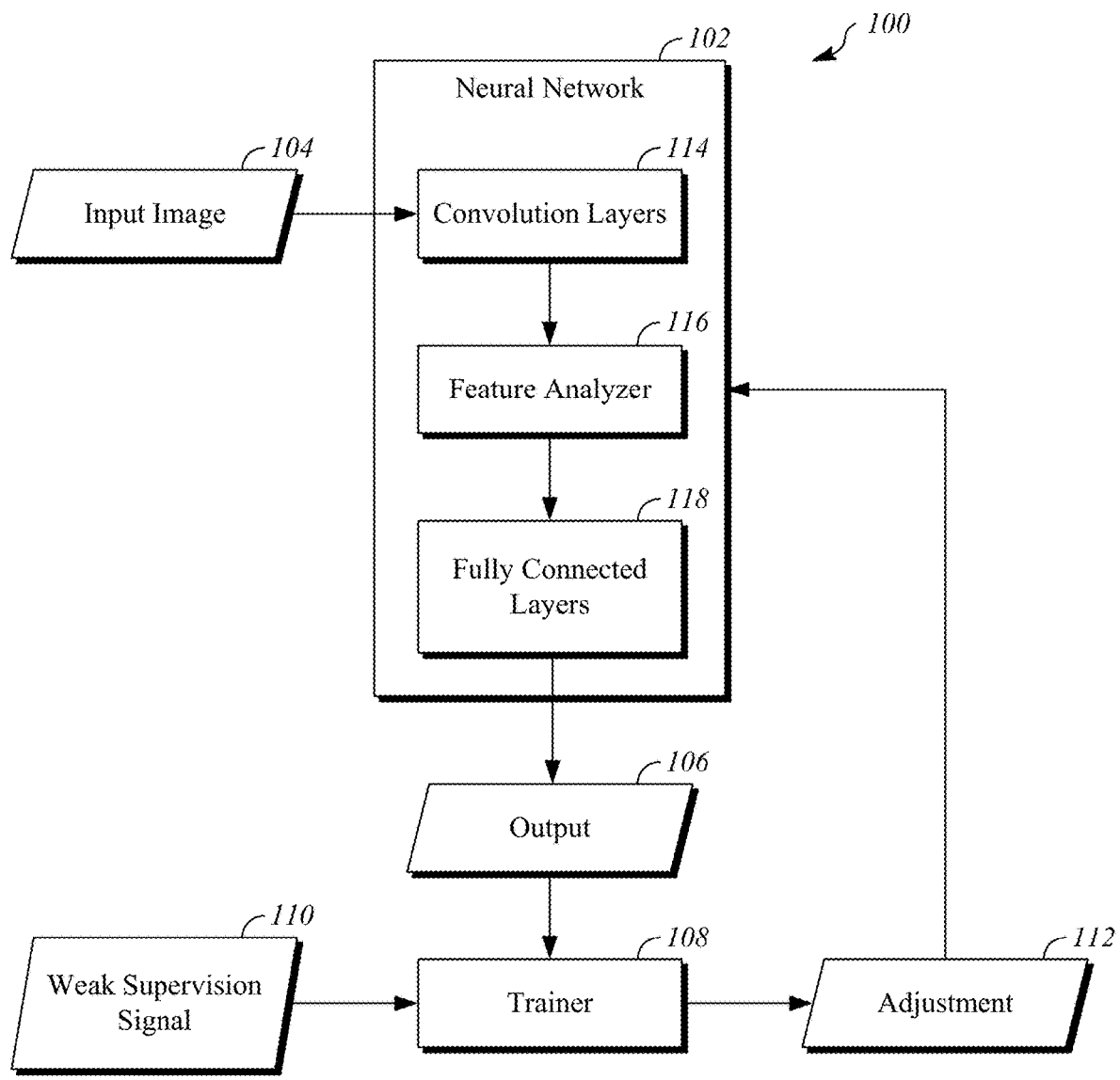
FIG. 1 is a block diagram that shows an example of a machine learning system that includes a neural network.

FIG. 1 is a block diagram that shows an example of a machine learning system 100. The machine learning system 100 includes a neural network 102, which may be implemented using one or more computing devices. The neural network 102 receives an input image 104 and produces an output 106. The output 106 may be a binary value that represents an evaluation, by the neural network 102, as to presence or absence of a characteristic, such as whether the input image satisfies a condition or a set of conditions. As will be explained herein, however, the neural network 102 is trained by weakly supervised learning methods and is not provided with information describing what the characteristic is. For example, the neural network 102 is not provided with sub-problem class labels or any other structured, supervised information, and instead, learns a high-level representation of the visual scene using binary labels relating to the whole image.

The neural network 102 includes convolution layers 114, a feature analyzer 116, and fully connected layers 118. The convolution layers 114 and the fully connected layers 118 are conventional, and can be implemented in manners known by persons of ordinary skill in the art. The feature analyzer 116 will be explained in detail herein.

Initially, the input image 104 is processed by the convolution layers 114. The convolution layers 114 may be in the form of a standard convolution stack. In an example implementation, four convolution layers are included in the convolution stack, which is configured to use exponential linear unit (ELU) activation, no bias, batch normalization (post-activation), and padding to align the first convolution filter and the last convolution filter with the edges of the input. The features-size-stride dimensions of the four layers, in this example implementation, are 128-3-1, 128-5-2, 128-5-1, and 128-3-1.

The output of the convolution layers 114 may be in the form of feature vectors that correspond to spatial locations from the input image 104. Thus, the output may be thought of as a three-dimensional matrix that represents the presence of features in the input image 104, having spatial dimensions (e.g., X and Y), and a feature dimension.

As will be explained further herein, the feature analyzer 116, which may also be referred to as feature analysis layers, is a portion of the neural network 102 that produces histogram-like statistics regarding the features that are present in the input image 104. The output of the feature analyzer 116 is provided as an input to the to fully connected layers 118. As one example, the configuration of the fully connected layers 118 may include 4 layers in the form of: m-elu-bnorm, $$\left\lfloor \frac{m}{2} \right\rfloor - elu\text{-}bnorm, \left\lfloor \frac{m}{4} \right\rfloor - elu\text{-}bnorm,$$

2-identity.

The fully connected layers 118 generate the output 106, which may be in the form of a binary value. The output 106 is a determination regarding a characteristic of the input image 104. As an example, the output 106 may represent a determination as to whether the input image 104 satisfies a condition or set of conditions. Subsequent to training of the neural network 102, this determination can be utilized to a decision based on the input image, such as a control decision for an automated system. As one example, the output 106 may represent an answer to a scene-understanding problem that is used by an autonomous vehicle to make a control decision.

During training of the neural network 102, the output 106 is provided to a trainer 108. The trainer 108 compares the output 106 to a weak supervision signal 110. The weak supervision signal 110 represents presence or absence of a characteristic in the input image 104. The weak supervision signal 110 may be, for example, a binary value. The trainer 108, based on comparison of the output 106 to the weak supervision signal 110, determines an adjustment 112 for the neural network 102. The adjustment 112 may include, for example, modified weights for connections between neurons in the neural network 102, and the modification may be made, for example, by backpropagation. The adjustment 112 may be performed, as examples, using a stochastic gradient descent algorithm or using the Adam optimization algorithm.

Subsequent to training of the neural network 102, the trainer 108, the weak supervision signal 110, and the adjustment 112 are omitted.

Figure 2:
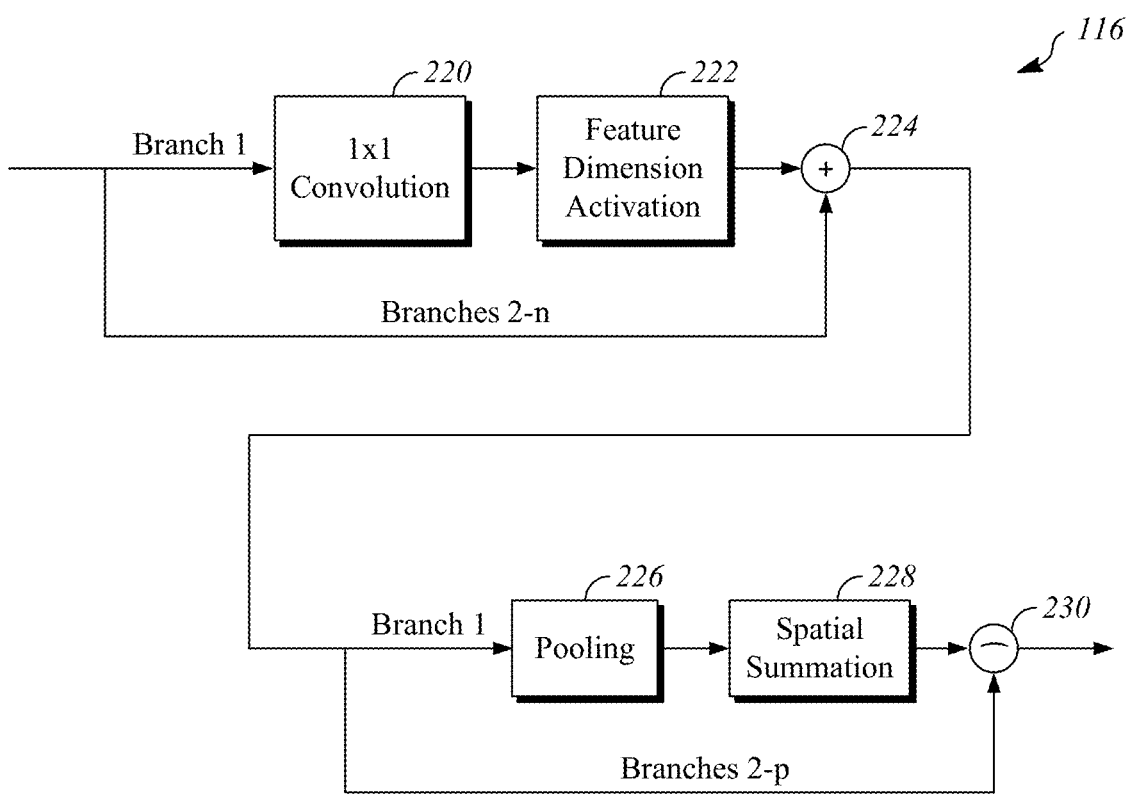
FIG. 2 is a block diagram that shows a feature analyzer of the neural network of FIG. 1.

FIG. 2 is a block diagram that shows the feature analyzer 116 of the neural network 102. The feature analyzer 116 includes a 1×1 convolution layer 220, a feature-dimension activation 222, a superposition operation 224, a pooling layer 226, a spatial summation operation 228, and a concatenation operation 230.

The output of the convolution layers 114 is received by the feature analyzer 116 and fed to one or more branches that include the 1×1 convolution layer 220 and the feature-dimension activation 222. The branches are indicated in FIG. 2 as "branch 1" and "branches 2-n," each of which is similar to branch 1. The 1×1 convolution layer 220 is operable to extract features at all spatial locations from the input image 104 the processing performed by the 1×1 convolution layer may be referred to herein as "similarity convolutions." Use of multiple branches allows the detection of multiple types of features at each location from the input image 104, by differences in the configurations of the 1×1 convolution layer 220 of each branch, as a result of training of the neural network 102. The number of branches can be set manually prior to training of the neural network 102. In an example implementation, favorable results were obtained using two branches (i.e., n=2).

As a result of the 1×1 convolution layer 220, the feature dimension describes, for each spatial location of the input image 104, a likelihood that each feature from a group of features is present in the input image 104. The features represented in the feature dimension are learned during training of the neural network 102, and description of the features need not be provided to the neural network 102 during training or otherwise.

Each branch proceeds separately from the 1×1 convolution layer 220 to the feature-dimension activation 222, by providing the output of the 1×1 convolution layer 220 to the feature-dimension activation 222 for the respective branch. As an example, the output of the 1×1 convolution layer 220 may be a matrix of features. The feature-dimension activation 222 is used to select the mixture of feature types that is represented by the output of the 1×1 convolution layer 220 for each branch. The feature-dimension activation 222 is performed in the feature dimension as opposed to the spatial dimensions, by applying an activation function in the feature dimension at each spatial location from the input image 104. As examples, the activation function may be the softmax activation function or the scaled exponential linear unit (selu) activation function. Alternatively, other activation functions may be used. As an example, when the softmax activation function is applied in the feature dimension, it typically sets all but one of the values in the feature dimension at a particular spatial location of the input image 104 equal to zero.

Subsequent to the feature-dimension activation 222 for each of the branches, the feature matrices resulting from the feature-dimension activation 222 for each of the branches are combined by the superposition operation 224. The superposition operation 224 combines the feature matrices by simple addition. In the cases where the softmax activation function or the selu activation function are used, the superposition operation 224 creates a potentially sparse type vector at each spatial location of the input image 104. In implementations where the softmax activation is used, the superposition operation 224 will produce a soft, k-hot vector at each spatial location of the input image 104.

The output of the superposition operation 224 is fed to one or more branches that perform the pooling operation 226 and the spatial summation operation 228. The branches are indicated in FIG. 2 as "branch 1" and "branches 2-p," each of which is similar to branch 1.

The pooling operation 226 is applied to the feature matrices separately in each branch by applying a different size pooling layer in each branch. The purpose of the pooling operation 226 is to capture information about the clustering of features in space. As an example, the pooling layers may be max pooling layers, which use the maximum values from each of a cluster of neurons from the prior layer. Subsequent to pooling, the spatial summation operation 228 is applied independently to the results of the pooling operation 226 for each of the branches. The spatial summation operation 228 is applied in the spatial dimensions to each feature from the feature dimension, by summing the values for each feature across the spatial dimensions. In each of the branches, the result of the spatial summation operation 228 is a histogram-like vector. During the concatenation operation 230, the vectors from the spatial summation operation 228 for each branch are concatenated into a vector, which is provided as an input to the fully connected layers 118 and utilized by the fully connected layers in generating the output 106, as previously described.

Figure 3:
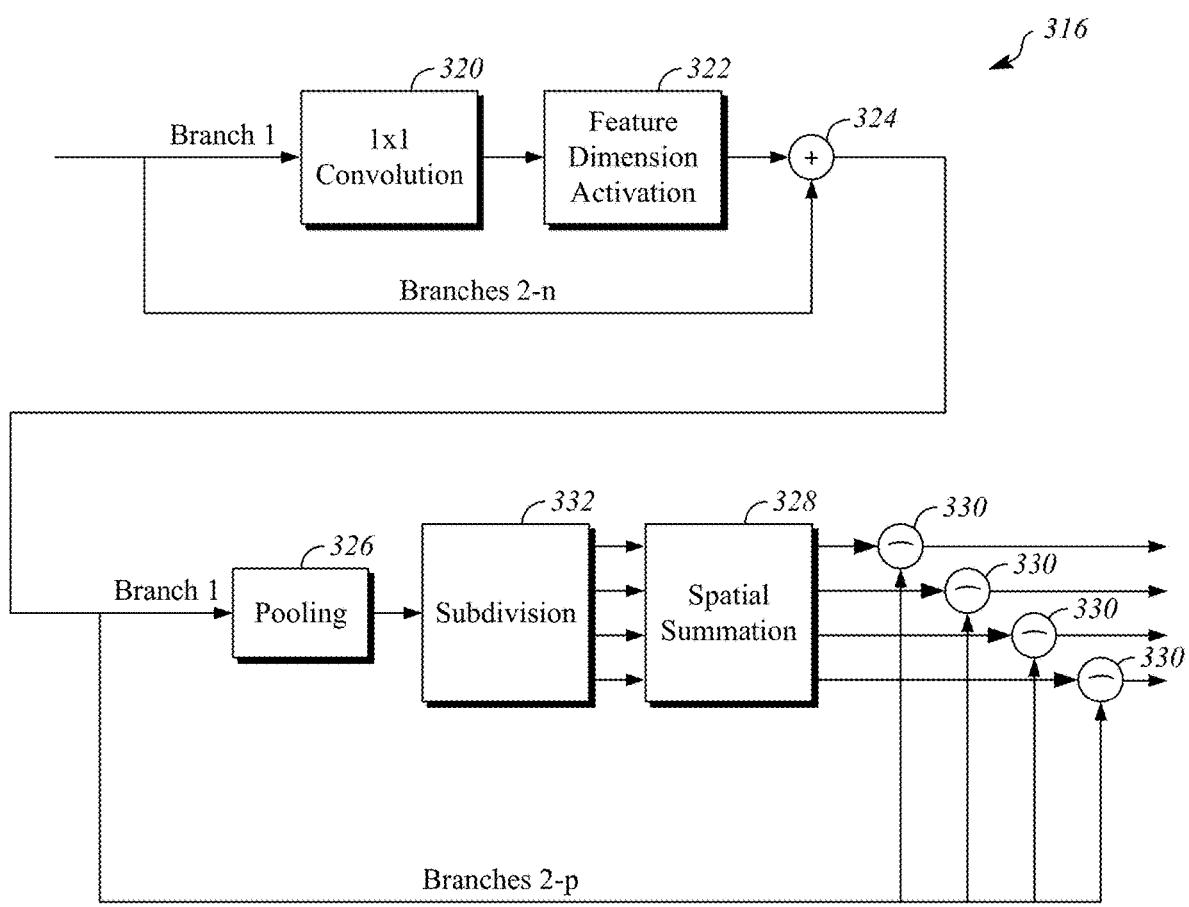
FIG. 3 is a block diagram that shows a feature analyzer according to an alternative implementation.

FIG. 3 is a block diagram that shows a feature analyzer 316 according to an alternative implementation, which can be utilized in the neural network 102 in place of the feature analyzer 116. The feature analyzer 316 includes a 1×1 convolution layer 320, a feature-dimension activation 322, a superposition operation 324, and a pooling layer 326, all of which are the same as corresponding features of the feature analyzer 116. Subsequent the pooling layer 326, a spatial subdivision operation 332 divides the image features into multiple spatial regions, such as four spatial regions in the illustrated example, and a spatial summation operation 328 is performed separately for each of the spatial regions, thus spatially summing the feature information within each of the spatial regions. The spatial summation operation 328 is the same as the spatial summation operation 228, except that it is applied the across a portion of the input image (e.g., a fractional area of the input image or an area representing a block of pixels from the input image 104) instead of being applied across the entirety of the input image 104. The same operations may be performed for each of multiple branches, and concatenation operations 330 may be performed separately for each of the spatial regions, resulting in multiple spatially summed feature vectors that each represent a portion of the input image and are provided to the fully connected layers 118 as inputs.

Figure 4:
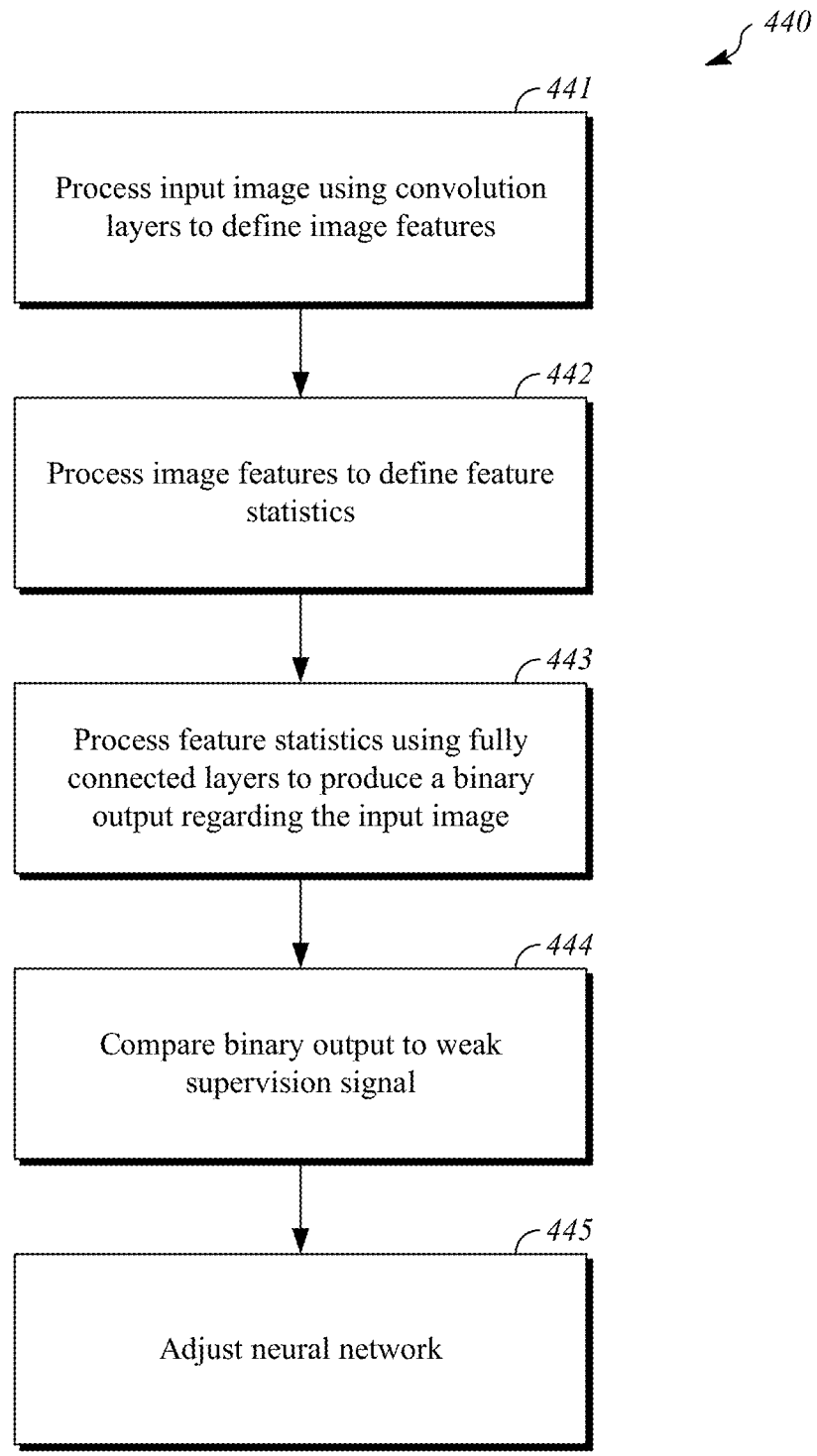
FIG. 4 is a flowchart that shows a process for processing an input image using a neural network.

FIG. 4 is a flowchart that shows a process 440 for processing an input image using a neural network. As an example, the process 440 can be implemented to process the input image 104 using the neural network 102. The process 440 may be performed using a computing device, such as one implemented using a processor and a memory. As an example, the operations of the process 440 may be implemented in the form of computer program instructions that are stored in a memory device and are executable by a processor to cause the processor to perform the operations of the process 440.

In operation 441, the input image 104 is processed using the convolution layers 114 of the neural network 102 in the manner previously described. Processing the input image using the convolution layers 114 results in image features. The image features may be arranged in a matrix of values that represent the image features, having a first spatial dimension (e.g., height) and a second spatial dimension (e.g., width) that correspond to spatial locations from the input image 104, and a feature dimension that corresponds to individual features that may be present in the input image 104. The image features may be configured such that they include values representing presence or absence of features in the input image 104 with respect to each of the first spatial dimension, the second spatial dimension, and the feature dimension from the input image 104.

In operation 442, the image features are processed to define feature statistics. The image features may be processed in operation 442 in the manner described with respect to the feature analyzer 116. Processing the image features in operation 442 includes applying an activation function in the feature dimension of the image features. In some implementations, the activation function that is applied in the feature dimension is a softmax activation function. In some implementations, the activation function that is applied in the feature dimension is a scaled exponential linear unit activation function. Other activation functions can be used.

Processing the image features in operation 442 may also include applying a 1×1 convolution prior to applying the activation function in the feature dimension. In addition, processing the images features in operation 442 may include applying the 1×1 convolution and applying the activation function in the feature dimension two or more times in parallel branches. Values obtained from the parallel branches are combined. As one example, the values obtained from the parallel branches of 1×1 convolution and feature-dimension activation may be combined by superposition.

Processing the image features in operation 442 may further include applying pooling subsequent to applying the activation function in the feature dimension and subsequent to superposition if multiple branches are utilized for 1×1 convolution and feature-dimension activation.

Processing the image features in operation 442 may also include summing the image features in a first spatial dimension and a second spatial dimension subsequent to applying pooling, such that the feature statistics include a spatially-summed vector that represents the image features. In some implementations, spatial summation is performed across the entirety of the input image 104. In other implementations, the input image is spatially subdivided into multiple portions, and spatial summation is performed across each of the image portions resulting from the spatial subdivision.

Processing the images features in operation 442 may include applying pooling and summing the image features two or more times in parallel branches, wherein pooling is applied using a different pooling size for each of the parallel branches. Values obtained from the parallel branches may be combined by concatenation.

In operation 443, the feature statistics that were determined in operation 442 are processed using the fully connected layers 118 to produce a binary output regarding a characteristic of the input image. Operation 443 may be performed in the manner previously described with respect to the fully connected layers 118.

Operations 444 and 445 are optional and may be performed during training of the neural network 102. In operation 444, the binary output that was produced by the fully connected layers in operation 443 is compared to a weak supervision signal that corresponds to the input image. As an example, the weak supervision signal may be a binary value that represents presence or absence of a characteristic in the input image 104. Based on the comparison, in operation 445, an adjustment is made to the neural network 102, such as an adjustment to weights associated with the neural network 102 by backpropagation.

Figure 5:
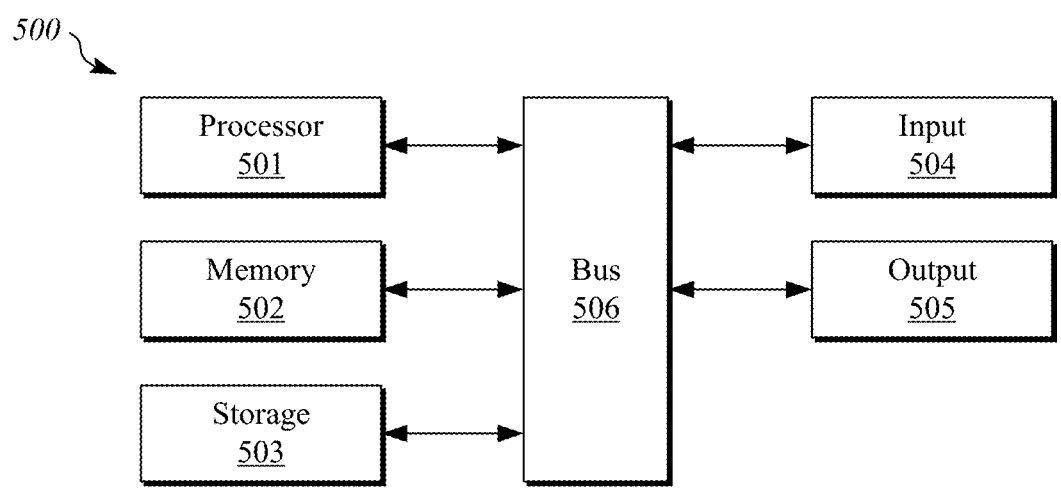
FIG. 5 is an illustration that shows an example of a hardware configuration for a computing device.

FIG. 5 is an illustration that shows an example of a hardware configuration for a computing device that can be used to implement the systems and methods described herein. The computing device 500 may include a processor 501, a memory 502, a storage device 503, one or more input devices 504, and one or more output devices 505. The computing device 500 may include a bus 506 or a similar device to interconnect the components for communication. The processor 501 is operable to execute computer program instructions and perform operations described by the computer program instructions. As an example, the processor 501 may be a conventional device such as a central processing unit. The memory 502 may be a volatile, high-speed, short-term information storage device such as a random-access memory module. The storage device 503 may be a non-volatile information storage device such as a hard drive or a solid-state drive. The input devices 504 may include any type of human-machine interface such as buttons, switches, a keyboard, a mouse, a touchscreen input device, a gestural input device, or an audio input device. The output devices 505 may include any type of device operable to provide an indication to a user regarding an operating state, such as a display screen or an audio output.

Figure 6:
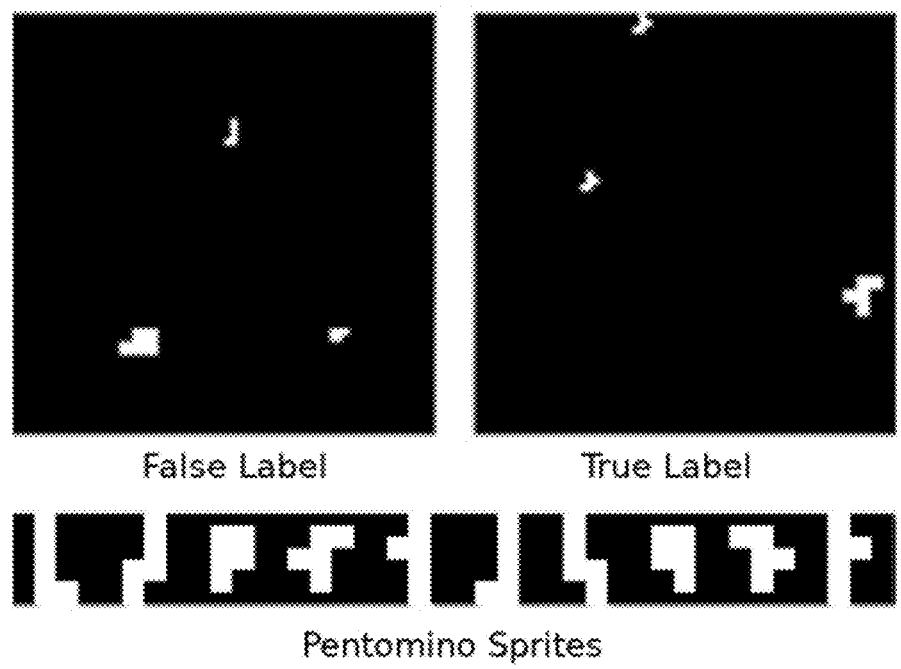
FIG. 6 shows an example of the Pentomino problem using the Pentomino dataset.

The systems and methods described herein improve the ability of neural networks to solve certain types of problems relative to previously known techniques. For example, in the paper entitled *Knowledge Matters: Importance of Prior Information for Optimization* (The Journal of Machine Learning Research, 17(1):226-257), a problem is proposed using a dataset, referred to as the Pentomino dataset, as shown in FIG. 6, which consists of a set of sprites. The dataset is generated by placing three sprites onto a canvas using either or both of a fixed, rectilinear rotation or integer scaling. The goal of the neural network is to predict a 1 if the sprites in an image are the same and 0 otherwise. One possible solution to the Pentomino problem is to learn to segment, classify, and count the number of underlying objects in the image. *Knowledge Matters* concluded that it was not possible, using then-known techniques, to find a solution to the Pentomino problem using a generic network given only the binary label for each image. Instead, the proposed solution in *Knowledge Matters* was a two-part process that included a classification step.

Figure 7:
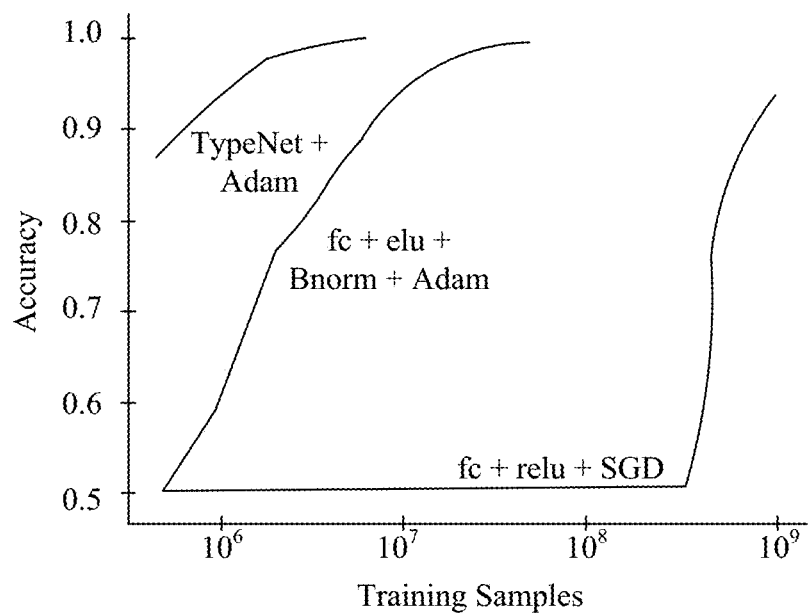
FIG. 7 shows an example of experiments performed using the Pentomino problem.

As shown in FIG. 7, which shows an example of experiments performed using the Pentomino problem, the systems and methods described herein (labeled TypeNet+Adam) solve the Pentomino problem with a test error of one percent, and more quickly that other known techniques (labeled fc+elu+BNorm+Adam) developed subsequent to publication of *Knowledge Matters*, and that the modeled thought unsuccessful in *Knowledge Matters* (labeled fc+relu+SGD) does make progress on the Pentomino problem given enough time (over 1000 epochs).

Figure 8A:
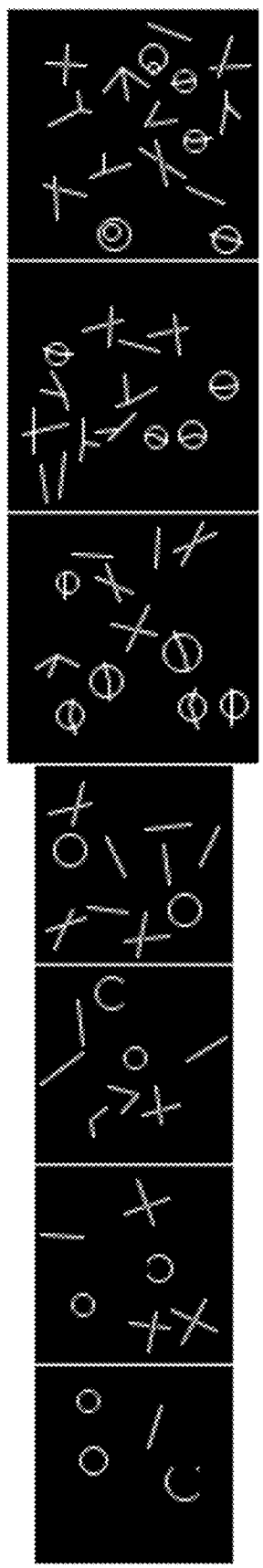
FIG. 8A shows true examples for the 2-2 to 8-2 All-Pairs problems.
Figure 8B:
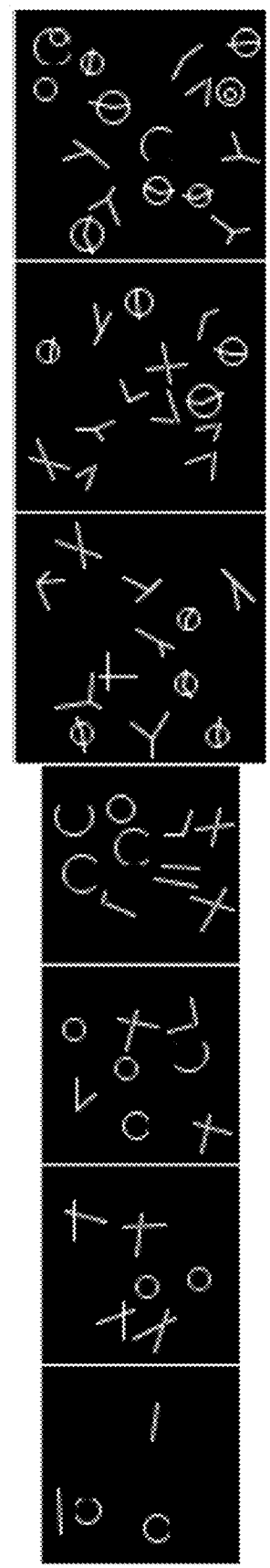
FIG. 8B shows false examples for the 2-2 to 8-8 All-Pairs problems.

The systems and methods described herein were also tested using a problem referred to herein as the "All-Pairs" problem, which utilizes 2N symbols from an alphabet of K choices, and described as having a complexity of N-K. Each example is true if its symbols completely pair up with a symbol of the same type without reuse, and false otherwise. Symbols are positioned randomly in the images, with no overlap. FIG. 8A shows true examples for the 2-2 to 8-8 All-Pairs problems, and FIG. 8B shows false examples for the 2-2 to 8-8 All-Pairs problems. A data generator is used to generate on-demand, never before seen training examples (e.g., the 4-4 All-Pairs problem has approximately 1028 unique images). A fixed validation set is generated at the start of training to monitor the training progress.

Conventional algorithms that were reviewed have difficulty with the 4-4 All-Pairs problem, as shown in TABLE I. Of the ten runs of each algorithm shown in TABLE I, none achieved more than 92% test accuracy after training on 100 M samples.

TABLE I

| algorithm | accuracy | std deviation |
|---|---|---|
| Relational Net [×10] | 0.867 | 0.078 |
| Inception v3 [×10] | 0.803 | 0.079 |
| Resnet-34 [×10] | 0.788 | 0.068 |
| Resnet-18 [×10] | 0.711 | 0.157 |
| Vgg19 [×6] | 0.509 | 0.002 |
| Vgg16 [×3] | 0.506 | 0.002 |

The neural network architecture described herein is referred to as a TypeNet because it estimates the affinity of each receptive field to a number of ideal types (via a dot-product) and then aggregates those type-affinities over the spatial extent. This summation is global for solving the All-Pairs problem but can be spatially restricted. TypeNet consistently achieves 100% test accuracy in the 4-4 All-Pairs problem using 20 k test samples. As an example, these results were achieved with the following training setup for the TypeNet results on the All-Pairs problem: 4 GPUs, batch size 600, Adam with learning rate=0.001 and no weight decay, cross-entropy loss, test results reported every 50 k training samples, and training stopped at 100 M training samples. The weight initialization, training samples, and testing samples are all randomized for different training runs. A training run equivalent to 2,000 epochs was utilized for a training size of 50 k training samples.

The main hyper-parameters and architecture-variations explored are the feature activation, number of branches (k) of 1×1 convolution and feature-dimension activation, and the number of features (n). First, activation with n=64 and k=2 was explored. Activation functions considered included: elu, identity, relu, selu, sigmoid, softmax, softplus, and tanh. Softmax and selu we found, through experiments, to be the most useful activations. Softmax, in particular, exhibits good results and low training variance.

How the number of branches, k, affects training was studied by experimentation, with results as shown in TABLE II. All trials reached 100% accuracy, save for one three branch trial which got stuck at a test accuracy of 99.948% after 30 M training examples. Based on the number of samples needed to reach maximum test accuracy, k=2 gave the best performance for this problem.

TABLE II

| branches (k) | accuracy | training samples |
|---|---|---|
| 1 [×9] | 1.0 ± 0.0 | 57.1M ± 3.8M |
| 2 [×10] | 1.0 ± 0.0 | 47.7M ± 4.7M |
| 3 [×20] | 1.0 ± $10^{-4}$ | 49.4M ± 8.9M |

The softmax activated network with two branches was found to train faster for more features as summarized in TABLE III. All options consistently achieved 100% test accuracy, so this trade-off for the 4-4 problem might be made to optimize training time or inference time.

TABLE III

| features | accuracy | training samples |
|---|---|---|
| 48 [×9] | 1.0 ± 0.0 | 57.0M ± 8.9M |
| 64 [×10] | 1.0 ± 0.0 | 47.7M ± 4.7M |
| 96 [×20] | 1.0 ± 0.0 | 40.5M ± 7.7M |

TypeNet was evaluated on other datasets to determine its applicability to common classification problems. TABLE IV presents the best accuracy from four training runs. The identity initialization was found to be most useful for these classification problems with selu and softmax sometimes performing comparably. For these classification tasks, adding an avg pool and max pool pathway before the activation was useful, so the activation list in the table shows two extra activations.

TABLE IV

| dataset | max acc. | stdev | model |
|---|---|---|---|
| MNIST | 0.9971 | 0.0006 | 128-SeSeSeSe |
|  | 0.9886 | 0.0111 | 128-IIII |
|  | 0.9961 | 0.0119 | 128-SmSmSmSm |
| Fashion-MNIST | 0.9346 | 0.0011 | 128-IIII |
|  | 0.9223 | 0.0050 | 128-SmSmSmSm |
| CIFAR10 | 0.8198 | 0.0098 | 128-IIII |
|  | 0.8101 | 0.0105 | 128-SmSSSm |
|  | 0.7256 | 0.0714 | 128-SmSmSmSm |

What is claimed is:

1. A method, comprising:
processing an input image using convolution layers to define image features;
processing the image features by applying an activation function in a feature dimension of the image features to define feature statistics and summing the feature statistics in a first spatial dimension and a second spatial dimension to define a spatially-summed feature vector; and
processing the spatially-summed feature vector using fully connected layers to produce a binary output regarding a characteristic of the input image.

2. The method of claim 1, wherein processing the image features further includes applying a 1×1 convolution prior to applying the activation function in the feature dimension.

3. The method of claim 2, wherein processing the image features is performed by applying the 1×1 convolution and applying the activation function in the feature dimension two or more times in parallel branches.

4. The method of claim 3, wherein values obtained from the parallel branches are combined by superposition.

5. The method of claim 1, wherein processing the image features further includes applying pooling to the feature statistics subsequent to applying the activation function in the feature dimension.

6. The method of claim 5, wherein summing the feature statistics in the first spatial dimension and the second spatial dimension is performed subsequent to applying pooling.

7. A method, comprising:
processing an input image using convolution layers to define image features;
processing the image features to define feature statistics, wherein processing the image features includes applying an activation function in a feature dimension of the image features; and processing the feature statistics using fully connected layers to produce a binary output regarding a characteristic of the input image,
wherein processing the image features further includes summing the feature statistics in a first spatial dimension and a second spatial dimension subsequent to applying pooling to the feature statistics, such that the feature statistics include a spatially-summed vector that represents the image features, and
wherein processing the image features is performed by applying pooling and summing to the feature statistics two or more times in parallel branches, wherein pooling is applied using a different pooling size for each of the parallel branches.

8. The method of claim 7, wherein values obtained from the parallel branches are combined by concatenation.

9. The method of claim 1, wherein the image features include values representing presence or absence of features in the input image with respect to each of a first spatial dimension, a second spatial dimension, and the feature dimension.

10. The method of claim 1, wherein the activation function is a softmax activation function.

11. The method of claim 1, wherein the activation function is a scaled exponential linear unit activation function.

12. A neural network for processing an input image, comprising:
    convolution layers that accept the input image as an input and produce a feature matrix including values for image features representing presence or absence of the image features in the input image with respect to a first spatial dimension, a second spatial dimension, and a feature dimension;
    a feature analyzer that accepts the feature matrix as an input, applies an activation function in the feature dimension, and produces a spatially-summed feature vector by summing the image features in a first spatial dimension and a second spatial dimension; and
    fully connected layers that accept the spatially-summed feature vector as an input and produce a binary output regarding a characteristic of the input image.

13. The neural network of claim 12, wherein the feature analyzer applies a 1×1 convolution prior to applying the activation function in the feature dimension.

14. The neural network of claim 13, wherein the feature analyzer utilizes two or more parallel branches to apply the 1×1 convolution and to apply the activation function in the feature dimension, and values obtained from the parallel branches are combined by superposition.

15. The neural network of claim 12, wherein the feature analyzer applies pooling subsequent to application of the activation function in the feature dimension.

16. The neural network of claim 15, wherein the feature analyzer sums the image features in the first spatial dimension and the second spatial dimension subsequent to application of pooling.

17. A neural network for processing an input image, comprising:
    convolution layers that accept the input image as an input and produce a feature matrix including values for image features representing presence or absence of the image features in the input image with respect to a first spatial dimension, a second spatial dimension, and a feature dimension;
    a feature analyzer that accepts the feature matrix as an input, applies an activation function in the feature dimension, and produces a spatially-summed feature vector; and
    fully connected layers that accept the spatially-summed feature vector as an input and produce a binary output regarding a characteristic of the input image,
    wherein the feature analyzer applies pooling subsequent to application of the activation function in the feature dimension,
    wherein the feature analyzer sums the image features in a first spatial dimension and a second spatial dimension subsequent to application of pooling to define the spatially-summed feature vector, and
    wherein the feature analyzer applies pooling and summing to the image features two or more times in parallel branches, wherein pooling is applied using a different pooling size for each of the parallel branches, and values obtained from the parallel branches are combined by concatenation.

18. A method for training a neural network, comprising:
processing an input image using convolution layers to define image features;
processing the image features using feature analysis layers to define feature statistics, wherein processing the image features includes applying a 1×1 convolution to the image features and applying an activation function in a feature dimension of the image features;
processing the feature statistics using fully connected layers to produce a binary output regarding a characteristic of the input image; and
adjusting at least one of the convolution layers, the feature analysis layers, and the fully connected layers based on a comparison of the binary output to a weak supervision signal that corresponds to the input image.

19. The method of claim 18, wherein processing the image features further includes applying pooling subsequent to applying the activation function in the feature dimension.

20. The method of claim 19, wherein processing the image features further includes summing the image features in a first spatial dimension and a second spatial dimension subsequent to applying pooling, such that the feature statistics include a spatially-summed vector that represents the image features.

* * * * *